A. D. BOULANGER, Jr.
LEATHER WORKING MACHINE.
APPLICATION FILED OCT. 10, 1918.
1,311,749. Patented July 29, 1919.
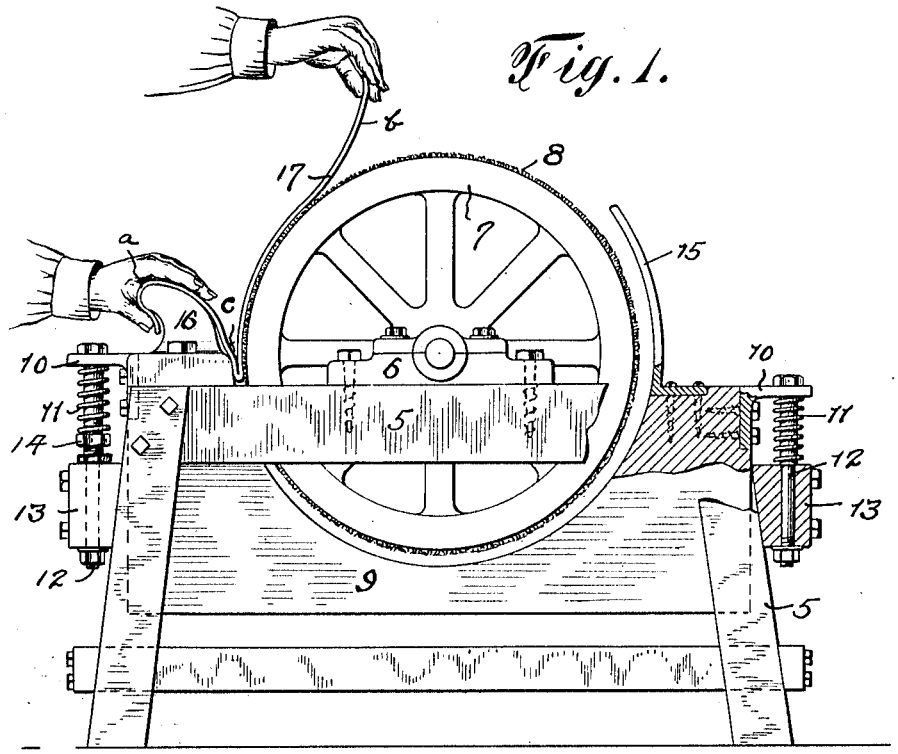
Inventor
ANTHONY D. BOULANGER, JR
By his Attorneys

UNITED STATES PATENT OFFICE.

ANTHONY D. BOULANGER, JR., OF RIDGEFIELD PARK, NEW JERSEY.

LEATHER-WORKING MACHINE.

1,311,749.　　　　Specification of Letters Patent.　　Patented July 29, 1919.

Application filed October 10, 1918.　Serial No. 257,648.

*To all whom it may concern:*

Be it known that I, ANTHONY D. BOULANGER, Jr., a citizen of the United States of America, residing at Ridgefield Park, in the county of Bergen and State of New Jersey, have invented certain new and useful Improvements in Leather-Working Machines, of which the following is a specification.

My invention relates to machines for softening leather strips, and the object of my invention is to provide an inexpensive apparatus, simple to operate, rapid in action, and adapted to soften leathers of different types with equal and great efficiency.

In the accompanying drawings,

Figure 1 is a broken side elevation of a machine in which my invention is embodied in one form;

Fig. 2 is a front elevation thereof;

Fig. 3 is a partial side elevation, showing a different type of wheel.

In the preparation of leather strips for industrial uses and the like, it is highly desirable to subject them to a softening action, and this is particularly true of stiff leathers which are normally so hard and inflexible that they could not otherwise be used with success. Heretofore the softening operation has been performed by hand—a tedious and expensive procedure with results of uncertain and varying character. The present invention provides a machine by which the softening operation may be effected economically, rapidly, and efficiently with a uniformity and completeness not hitherto attained.

In the form here shown, the frame 5 of the machine carries bearings 6 for working wheel 7, provided with any sort of friction surface 8 at its periphery to grip the leather strip which is to be worked. A sanded surface is satisfactory, but may be replaced by any suitable substitute.

The lower half of the wheel is embraced by a cradle 9, which is supported by end brackets 10, springs 11, and guide bolts 12, passing through the end cross bars 13 of the frame. By drawing down on or loosening the bolts 12, the spacing of the cradle bed from the wheel periphery may be varied as needed to accommodate leathers of different thicknesses or textures. Moreover, adjusting nuts 14 may be mounted on the bolts 12 at the front end of the machine to increase or decrease the tension of the springs 11 at this end of the machine. While the curvature of the cradle bed is such that it may be arranged substantially concentric to the wheel, the adjustment, through the nuts 14, is preferably such that the front end of the cradle approaches the periphery of the wheel more closely than at the back. A return guard 15 rises from the back of the cradle. This may be of any suitable shape, but I have here shown it curved to follow the periphery of the wheel. A hand-grip 16 is mounted at the front of the cradle adjacent the wheel.

In operation, the wheel 7 is rotated at a relatively high speed—say about 100 to 200 revolutions per minute. The operator holds one end $a$ of the leather strip 17 on the hand-grip 16, and the other end $b$ up after buckling the strip to form a fold $c$, which is engaged between the wheel and the cradle bed. The rotation of the wheel tends to carry the fold $c$ down between the cradle and the periphery of the wheel. Inasmuch as the end $a$ of the strip is held stationary by the operator and the upper end $b$ released as soon as the wheel takes hold of the fold $c$, the free end is drawn down between the wheel and the cradle bed, the fold $c$ progressively advancing from one end to the other of the strip. This action breaks the fibers or the adhesion between the fibers of the leather and thus softens it. The operation is repeated with the strip in reverse position and also with the strip inserted on the bias, so as to break the fibers not only in opposite directions lengthwise of the strip, but also in both directions transversely thereof. This renders the leather pliable and completely flexible in all directions.

If the operator should happen to let go at the hand-grip 16, the strip 17 is merely carried around by the wheel and flipped back to the operator by the return guard 15. The working operation is repeated from five to ten times, depending upon the stiffness of the leather and the degree of pliability desired. The operations are very rapidly performed, and where the strips are four or five inches wide and twenty-four to thirty inches long, several may be worked in a minute's time. The diameter of the wheel 7 is about twenty inches, and its width about ten, but, of course, these dimensions may be variously modified.

After the strip has been softened, it is ready for some uses as it stands. For other purposes, it may be desirable to dye the leather and then polish it, or to polish without dyeing. In such case the strips are passed to a polishing machine of the type shown in Fig. 3. Alternatively, a supply of strips may be softened and the friction wheel 7 be then replaced by a polishing wheel, such as shown in Fig. 3, the bearings 6 being readily opened to permit such substitution. In this wheel, the periphery carries cross bars 18 of polished glass or the like. The cradle is readjusted to such proximity to the polishing wheel that the bars 18 bear against the surface of the strip 17 when the latter is inserted single ply. The polishing operation consists simply in inserting the strip and holding it the desired length of time in the position shown in Fig. 3, after which the operator reverses the position of the strip so as to polish the end previously held on the hand-grip. In order to draw the strip back against the pull of the wheel, it is merely necessary for the operator to depress the cradle 9 against the pressure of the springs 11 a sufficient distance to clear the cross bars 18.

I am aware that machines have long been known for rendering somewhat pliable leather in the form of large skins. Such machines are shown in the patents to Hovey, 253,533, Vaughan, 444,172, and Geipel, 941,317. These machines are elaborate, expensive, heavy, and cumbersome affairs, slow in operation, and neither intending to nor actually securing the extreme flexibility and uniformity of suppleness which is attained by the use of the present machine. Nor are any of these prior machines, so far as I am aware, readily transformable into a polishing machine.

Various modifications in construction will readily occur to those dealing with the subject, and I do not limit my claim of invention to the particular arrangement and construction shown or to its use with any particular leather.

I claim:—

1. A machine for rendering leather strips supple, comprising a rapidly rotated relatively narrow strip-working wheel, a cradle partially surrounding but slightly spaced from the same and a hand-grip for holding one strip end stationary while the other strip end is worked between the cradle and the wheel.

2. In combination with a construction such as specified in claim 1, a return guard on the cradle on the opposite side of the wheel from the hand-grip.

3. In a construction such as specified in claim 1, means for adjusting the cradle toward and from the friction wheel at the hand-grip end of the cradle.

4. The method of rendering hide strips supple which consists in passing the strips rapidly between a rotating drum and a coöperating cradle, said strips being presented to the drum at an angle to its plane of rotation and being subjected to a progressive fold at an angle to its length on one pass and at a different angle on a subsequent pass.

5. The method of rendering hide strips supple which consists in passing the strips rapidly between a rotating drum and a coöperating cradle, said strips being subjected to progressive folds in one direction on one pass and in the opposite direction on a subsequent pass, and at an angle to the length of the strip on certain passes whereby the folding action of the drum on all parts of the strips and in various directions is secured to render the strips supple in all directions throughout their length.

6. A machine for working hide strips, comprising a high speed working wheel having a frictional gripping surface, a yieldably supported cradle partially surrounding the wheel periphery but spaced therefrom to admit a folded hide strip, and a hand grip at one end of the cradle and adjacent the wheel for holding a strip end while the remainder of the strip is drawn about the wheel between the periphery of the latter and the cradle in a progressive fold, substantially as described.

7. A machine for working hide strips, comprising a high speed working wheel, a frame supporting the same, cross bars at opposite ends of the frame, a cradle spaced in the periphery of the working wheel and supporting springs between the opposite ends of the cradle and the cross bars upon which the cradle is yieldably mounted.

8. In a construction such as specified in claim 8, guide bolts engaging the cradle and cross bars and passing through the supporting springs, substantially as described.

9. In a construction such as specified in claim 8, means at one end of the cradle for varying the tension of the springs while maintaining the normal position of the cradle.

In testimony whereof I have signed my name to this specification.

ANTHONY D. BOULANGER, Jr.

Copies of this patent may be obtained for five cents each, by addressing the "Commissioner of Patents, Washington, D. C."